No. 743,814. PATENTED NOV. 10, 1903.
R. R. BOYD.
PROCESS OF TREATING COTTON WASTE.
APPLICATION FILED JULY 5, 1902.
NO MODEL.
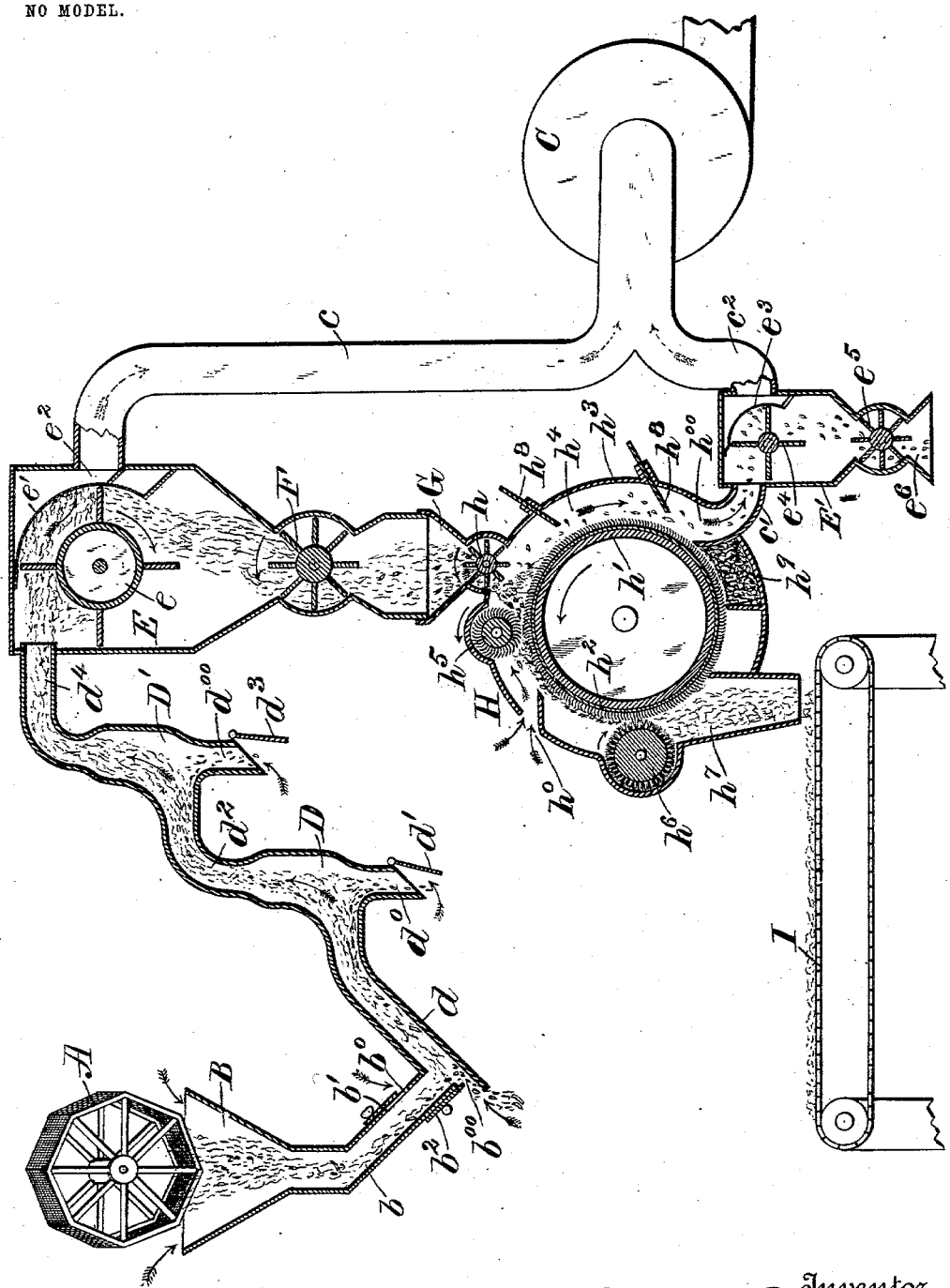
Witnesses
John H. Holt.
Gustave R. Thompson
Inventor
Robert R. Boyd,
by Wilkinson & Fisher,
Attorneys.

No. 743,814. Patented November 10, 1903.

UNITED STATES PATENT OFFICE.

ROBERT R. BOYD, OF MEMPHIS, TENNESSEE.

PROCESS OF TREATING COTTON-WASTE.

SPECIFICATION forming part of Letters Patent No. 743,814, dated November 10, 1903.

Application filed July 5, 1902. Serial No. 114,532. (No model.)

*To all whom it may concern:*

Be it known that I, ROBERT R. BOYD, a citizen of the United States, residing at Memphis, in the county of Shelby and State of Tennessee, have invented certain new and useful Improvements in Processes of Treating Cotton-Waste; and I do hereby declare the following to be a full, clear, and exact description of the invention, such as will enable others skilled in the art to which it appertains to make and use the same.

My present invention relates to improvements in processes for treating trashy seed-cotton, and more especially boll-screenings, such as are discharged from the end of the separating-screen in cotton-seed-oil mills. The cotton-waste issuing from these screen-separators usually contains various foreign bodies—such as nails, chips of wood, strings, small stones, boll-hulls, dust, &c.—and in this condition it is of little or no commercial value; but as this waste product usually contains a considerable amount of good cotton the quantity of the latter which is annually wasted by burning or being otherwise destroyed is very great.

It is one of the objects of my invention to convert the cotton of this waste into a profitable product by separating the foreign substances from it and rendering it fit for the gin. The present process, however, is not limited to the treatment of boll-screenings alone, but may with results equally as satisfactory be employed in the treatment of gathered cotton or such as is harvested with the boll-hull as contradistinguished from picked cotton. This gathered cotton is usually that which is left in the field after the picking or such cotton as has been killed by early frost before it could be picked and in either case contains a large quantity of boll-hulls, which, together with dust, dried leaves, &c., my process is designated to separate from the cotton in a most efficient manner. To this end my present invention embodies an improvement upon the process described in my Patent No. 661,166, dated November 6, 1900.

In order to more thoroughly describe the process embodying my present invention, reference will be had to the accompanying drawing, wherein is shown a form of apparatus for carrying out the said process.

The cotton-waste containing the foreign bodies above referred to and issuing from the screen A falls into a hopper B and passes thence into a downwardly-extending chute $b$. This chute is provided with openings $b^0$ and $b^{00}$, and these openings are provided with adjustable sliding covers $b'$ and $b^2$, respectively. The lower end of the chute $b$ is secured to and opens into the lower end of an upwardly-inclined chute $d$. A current of air passes upward through the chute $d$ in the direction of the feathered arrows, said air being produced by the rotary fan C. This air passes into the chute $d$ through chute $b$, where it enters by way of the hopper and opening $b^0$, and through the opening $b^{00}$. The adjustable slides $b'$ and $b^2$ upon the openings afford means for regulating the air-supply. The waste falling to the bottom of the chute $b$ meets the full force of the draft through chute $d$, and most of it will be taken by the draft up the said chute. Such heavy bodies, though, as nails, small stones, bolts, and the like, being of greater specific gravity than the rest of the waste, will refuse to rise with the air-draft up the chute $d$ and will be discharged therefrom through the opening $b^{00}$, when they may be conveyed away in any suitable manner, as in the case with any of the other waste products of this process. The waste carried by the air will then pass up the chute $d$ into a separating-chamber D, comprising a vertical chamber having its body enlarged and entrance and exit passages contracted and a discharge-opening $d^0$ through its bottom provided with an adjustable cover or door, such as $d'$, by which the extent of said opening may be varied. The object of this chamber is to separate such heavy particles as chips, &c., as have reached the chamber with the waste. The action of the air in effecting the separation of the heavier particles in the chamber is as follows: The air entering the chamber D from the chute $d$ is directed first in an approximately horizontal direction and then turns upward. By virtue of their greater weight certain bodies contained in the waste will, owing partly to their inertia and partly to gravity, refuse to rise with the air in its upward course, but will continue to travel in the horizontal direction, which will cause them to ultimately fall into opening $d^0$. Some of these bodies, however, will attempt to rise with the air and will be thrown out into the body of the chamber; but here the air, owing to the fact that it expands in the chamber D, will have reduced its velocity in that portion of the chamber into which the bodies are thrown and will therefore be incapable of raising the said bodies with it, which will then fall into the opening $d^0$. Again, there will be a centrifugal action as the current of air sweeps around the curve $d^6$, which will tend to throw heavy foreign particles into the body of the chamber, when they will fall into the outlet $d^0$. Moreover, owing to the fact that the outlet-neck $d^2$ is contracted relative to the body of the chamber, the air will meet with sufficient resistance in entering said outlet to impede its progress, and thereby assist in the process of separation of the comparatively heavy bodies. So it will be seen that there are in reality four actions taking place in the separating-chamber tending to separate the heavy particles from the lighter—centrifugal force, expansion of the air, the inertia of the heavy bodies or their tendency to continue in the direction in which they enter the chamber, and the impedance of the outlet. The waste which does not fall through the opening $d^0$ passes, with the current of air, up through the chamber D through a neck $d^2$ into a second enlarged chamber D', in which the same action takes place as in the chamber D, thus ridding the waste of the heavy bodies which escape with it through the said chamber. I do not, however, limit myself to the employment of two expansion-chambers, as their number will depend largely upon the character of the waste treated. In some cases one only may be employed. The heavy bodies separated in chamber D' are discharged through the opening $d^{00}$, provided with the door or cover $d^3$, which serves the same purpose as the door $d'$. It will also be seen that the air-suction upward through the openings $d^0$ and $d^{00}$, as well as through the opening $b^{00}$, will prevent the cotton from falling through said openings. From the chamber D' the waste, freed from all the foreign bodies discharged through the openings $b^{00}$, $d^0$, and $d^{00}$, passes on upward through a horizontal neck $d^4$ into the vacuum-box E. Passing into the said vacuum-box E, the waste strikes a clearer $e$, located in the upper part of the said box, and is carried against a dust-screen $e'$. The current of air, together with the dust from the waste, passes through said screen, then through openings $e^2$ into the tube $c$, and then to the fan C. The clearer $e$ removes the waste or cotton from the screen $e'$ and sends it to the bottom of the chamber E, where it is delivered by an air-tight pocket-valve F into a hopper G of the separator H. The waste is then fed through the lower part of the hopper G by a pocket-valve $h$, when it falls upon a rotating cylinder $h'$, covered with carding-cloth $h^2$ or any equivalent surface having a number of points or teeth. This cylinder is inclosed in a casing $h^3$, having an air space or passage $h^4$ between it and the cylinder.

Instead of employing two pocket-valves, such as the valves F and $h$, in some cases it is found advantageous to employ only one, in which event either the valve F or valve $h$ may be dispensed with, as the case may require.

The principal foreign bodies reaching the separator with the cotton are generally fibrous substances, such as boll-hulls, strings, and the like, such being too light for separation by gravity. Falling into the space $h^4$, some of the boll-hulls and other light bodies will be sucked around the air-passage, while the cotton and such bodies as are not blown off will adhere to the cylinder $h'$ and be carried thereby beneath a doffing-roller $h^5$, rotating at a higher speed than the cylinder $h'$ and inclosed in a casing $h^3$, which roller $h^5$ disintegrates the mass as it is carried along by the cylinder $h'$. This doffing-roller is set off from the cylinder far enough to release the boll-hulls from the cotton and knock them out into the air-current; but the cotton, together with the particles of string, if any be present, and such as have not adhered to the doffing-roller, will adhere to the cylinder. The loose cotton will be quickly blown back upon the cylinder, which next carries it past a high-speed revolving brush $h^6$, also inclosed in the separator-casing. This brush removes the remaining cotton and any string that may have come along with it from the cylinder $h'$ and sends it into the exit-trunk $h^7$, from which it is deposited upon a moving apron I. When the cotton has been thus deposited upon the said apron, any foreign bodies, such as string and the like, which have made their way through the machine with the cotton, may be removed in any convenient manner. Indeed one of the most effective ways of accomplishing this is by hand, as the labor required to do this work is usually cheap. The air entering the separator through the opening $h^0$ passes the doffing-roller and passes on around through the passage $h^4$ to the air-outlet $h^{00}$ and thence through the tube $c'$ to the vacuum-box E', the same in all respects as the box E. From this box E' the air passes by way of the duct $c^2$ to the fan C, while the boll-hulls and other trash swept from the screen $e^3$ by the clearer $e^4$ fall to an air-tight pocket-valve $e^5$, whence they are discharged through the opening $e^6$. The force of the air through the passages $h^4$ may be varied by the deflectors $h^8$, which at the same time direct the air against the cylinder. The air is prevented from passing into the outlet $h^{00}$ from both sides of the cylinder by means of the cushion $h^9$, of hair or other suitable material.

It will be observed that in the first stages of this process the waste travels in the same direction as the air-draft, and the heavier particles are separated by gravity or by their inability to follow the cotton and lighter bodies through the upwardly-directed air-drafts, while in the separator H the waste is sent against the air-draft, this latter step being particularly for the separation of boll-hulls, which may be readily drawn over the carding of the separator-cylinder, while the loose cotton will adhere to it. There is therefore through the apparatus a divided air-draft. In one division the waste is fed with the air, in the other against it. All of the passages through which the waste passes are closed to the outside air except as to the openings specified.

In the event that the process is used in the separation of bolls and trash from gathered cotton, the screen-hopper and chute $b$ may be dispensed with and the cotton taken directly into the chute $d$ from the floor. Moreover, instead of using a suction-fan and drawing the air through the apparatus the same result may be accomplished by forcing the air through from a blower, and indeed other minor changes may be made in this invention without departing from the spirit thereof; but

What I claim, and desire to secure by Letters Patent of the United States, is—

1. The process of treating cotton-waste, which consists in subjecting it to the action of a current of air, the waste traveling in the direction of said current, whereby the heavier trash is removed therefrom, afterward disintegrating the mass in the presence of a second current of air and causing the waste to travel against the second current whereby the lighter particles of trash are removed, substantially as described.

2. The process of treating cotton-waste, which consists in directing the waste downward into an upwardly-flowing current of air whereby the heaviest particles contained in the mass are removed, expanding the current of air in its upward flow whereby other heavy bodies are removed from the mass, interposing a resistance in the path of said waste and air, through which resistance the dust is blown, directing the waste then against a current of air and separating lighter foreign particles therefrom, substantially as described.

3. The process of treating cotton-waste, which consists in directing the waste into an upwardly-flowing current of air whereby the heaviest particles contained in the mass are removed, expanding the current of air successively in its upward flow whereby other heavy bodies are removed from the mass, directing the waste then against a current of air and separating lighter foreign bodies therefrom, substantially as described.

4. The process of treating cotton-waste, which consists in directing the waste downward into an upwardly-flowing current of air whereby the heaviest particles contained in the mass are removed, expanding the current of air in its upward flow whereby other heavy particles are removed from the mass, interposing a resistance in the path of said waste and air, through which resistance the dust is blown, disintegrating the mass and directing it then against a second current of air and separating lighter particles therefrom, substantially as described.

5. The process of treating cotton-waste, which consists in directing the waste into an upwardly-flowing current of air whereby the heaviest particles contained in the mass are removed, expanding the current of air successively in its upward flow whereby other heavy bodies are removed from the mass, blowing the dust out of said waste, directing the waste against a current of air and separating lighter particles therefrom, substantially as described.

6. The process of treating cotton-waste, which consists in directing the waste into an upwardly-flowing current of air whereby the waste is carried along with the said air and the heaviest particles contained in the mass are removed, changing the direction of the flow of said air and the waste carried thereby, expanding the current of air at the point of change of direction of its upward flow whereby other heavy bodies are removed from the mass, interposing a resistance in the path of said waste and current of air, through which resistance dust is blown, directing the waste then against a current of air and separating lighter particles therefrom, substantially as described.

7. The process of treating cotton-waste, which consists in directing the waste into the path of a current of air having an upward circuitous direction, expanding the said air at points where the said current of air changes its course whereby the heavy particles are separated from the mass, directing the mass into a second current of air, doffing light foreign bodies from the cotton in the presence of said air-current whereby these bodies are separated from the cotton, substantially as described.

8. The process of treating cotton-waste, which consists in directing the waste into the path of a current of air having an upward circuitous direction, expanding the said air at points where the said current of air changes its course whereby the heavy particles are separated from the mass, directing the mass into a second current of air, doffing the boll-hulls and the like from the cotton in the presence of said air-current whereby these bodies are separated from the cotton, substantially as described.

9. The process of treating cotton-waste, which consists in directing the waste into the path of a current of air having an upward circuitous direction, expanding the said air at points where the said current of air changes its course whereby the heavy particles are separated from the mass, then blowing the dust out of said mass, directing the waste into a second current of air and doffing the lighter particles from the cotton in the presence of said current whereby they are separated, and then separating any foreign particles from the remaining mass, substantially as described.

In testimony whereof I affix my signature in presence of two witnesses.

ROBERT R. BOYD.

Witnesses:
FRANK D. BLACKISTONE,
JOHN H. HOLT.